United States Patent
Osada et al.

(10) Patent No.: US 12,000,445 B2
(45) Date of Patent: Jun. 4, 2024

(54) DISC BRAKE AND PISTON BOOT

(71) Applicant: Hitachi Astemo, Ltd., Ibaraki (JP)

(72) Inventors: Takahito Osada, Hitachinaka (JP); Shigeru Hayashi, Hitachinaka (JP); Shinya Watanabe, Komaki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 373 days.

(21) Appl. No.: 17/416,896

(22) PCT Filed: Dec. 2, 2019

(86) PCT No.: PCT/JP2019/046961
§ 371 (c)(1),
(2) Date: Jun. 21, 2021

(87) PCT Pub. No.: WO2020/129583
PCT Pub. Date: Jun. 25, 2020

(65) Prior Publication Data
US 2022/0056972 A1 Feb. 24, 2022

(30) Foreign Application Priority Data
Dec. 19, 2018 (JP) .................................. 2018-237272

(51) Int. Cl.
*F16D 65/16* (2006.01)
*F16J 15/52* (2006.01)
*F16D 121/02* (2012.01)

(52) U.S. Cl.
CPC .............. *F16D 65/16* (2013.01); *F16J 15/52* (2013.01); *F16D 2121/02* (2013.01)

(58) Field of Classification Search
CPC ...................................................... F16D 65/16
See application file for complete search history.

(56) References Cited

U.S. PATENT DOCUMENTS 3,497,038 A * 2/1970 Anders .................... F16D 65/84
188/322.18
4,270,442 A * 6/1981 Bainard .................. F16D 65/18
188/72.4

(Continued)

FOREIGN PATENT DOCUMENTS

DE 3812495 10/1989
JP 54-111042 8/1979

(Continued)

OTHER PUBLICATIONS

International Search Report dated Dec. 24, 2019 in International (PCT) Application No. PCT/JP2019/046961, with English-language translation.

(Continued)

*Primary Examiner* — Melanie Torres Williams
(74) *Attorney, Agent, or Firm* — Wenderoth, Lind & Ponack, L.L.P.

(57) ABSTRACT

A disc brake including: a piston; a cylinder including a bore portion, which movably accommodates the piston, and a step portion formed on an opening end side of the bore portion; and a piston boot arranged between a tip side of the piston and a small diameter step portion of the cylinder. The piston boot includes: a large diameter annular fitting portion containing an annular metal member so as to be fitted to the small diameter step portion; a bellows portion, which extends from the large diameter fitting portion, is increased in its diameter from the large diameter fitting portion to an outer peripheral side, and is also deformed and extended from the large diameter fitting portion toward an inner peripheral side; and a small diameter fitting portion formed at an end portion of the bellows portion so as to fit to an outer periphery of the piston.

8 Claims, 7 Drawing Sheets

(56) References Cited

U.S. PATENT DOCUMENTS

| | | | |
|---|---|---|---|
| 4,503,947 A | | 3/1985 | Heidmann et al. |
| 4,537,289 A | * | 8/1985 | VonGrunberg .......... F16J 15/52 |
| | | | 188/264 G |
| 5,458,344 A | * | 10/1995 | Weiler .................... F16D 65/18 |
| | | | 277/637 |
| 5,558,345 A | | 9/1996 | Kobayashi et al. |
| 7,097,004 B2 | * | 8/2006 | Barrett .................... F16J 3/046 |
| | | | 188/73.1 |
| 8,991,565 B2 | * | 3/2015 | Champion ............ F16D 65/005 |
| | | | 188/72.4 |
| 2009/0307892 A1 | * | 12/2009 | Hashimoto ............. F16D 65/18 |
| | | | 29/446 |
| 2020/0141498 A1 | | 5/2020 | Suzuki et al. |

FOREIGN PATENT DOCUMENTS

| | | | |
|---|---|---|---|
| JP | 7-190202 | | 7/1995 |
| JP | 2002-327849 | | 11/2002 |
| JP | 2004-190841 | | 7/2004 |
| JP | 2013011301 A | * | 1/2013 |
| JP | 2017-211066 | | 11/2017 |

OTHER PUBLICATIONS

Written Opinion of the International Searching Authority dated Dec. 24, 2019 in International (PCT) Application No. PCT/JP2019/046961, with English-language translation.

Office Action dated Feb. 18, 2022, in corresponding India Patent Application No. 202117026850.

Office Action issued Feb. 23, 2024 in corresponding German Patent Application No. 11 2019 006 295.6, with English translation.

* cited by examiner

DISC BRAKE AND PISTON BOOT

TECHNICAL FIELD

The present invention relates to a disc brake configured to apply a braking force for a vehicle such as an automobile, and a piston boot used for the disc brake.

BACKGROUND ART

In general, in a disc brake installed in a vehicle such as an automobile, a piston slidably inserted into a bore of a cylinder presses a friction pad, to thereby apply a braking force to the vehicle. An annular step portion is formed on an opening side of the cylinder. A piston boot having flexibility is provided between the step portion and the piston.

The piston boot includes an annular fitting portion to be fitted to the step portion of the cylinder, and is configured to contain an annular metal member in this fitting portion, thereby being capable of increasing an assembling performance to the cylinder and durability of the piston boot (see Patent Literature 1).

CITATION LIST

Patent Literature

[PTL 1] JP 2017-211066 A

SUMMARY OF INVENTION

Technical Problem

However, in the piston boot containing the annular metal member, cut-away portions are formed around the fitting portion for the convenience of manufacturing. Parts of the metal member are thus exposed to an outside in the cut-away portions. As a result, there occurs such a problem that muddy water and the like is attached to the metal member through the cut-away portions, and corrosion resistance of the metal member consequently decreases.

Solution to Problem

An object of the present invention is to provide a disc brake and a piston boot used for the disc brake, which are capable of increasing corrosion resistance of a metal member contained in the piston boot.

According to one embodiment of the present invention, there is provided a disc brake, including:
  a piston configured to press at least one of a pair of pads opposed to each other on both surfaces of a disc;
  a cylinder which includes a bottomed bore portion for accommodating the piston movably in an axial direction and a step portion formed on an opening end side of the bottomed bore portion from which a tip of the piston protrudes, the step portion having an annular shape and a diametrical dimension larger than an inner diameter of the bottomed bore portion; and
  a piston boot which is arranged between the tip side of the piston and the step portion of the cylinder, and includes a bellows portion configured to expand and contract along with the movements of the piston,
  wherein the piston boot includes: a large diameter fitting portion having an annular shape and containing an annular metal member so as to be fitted to the step portion; the bellows portion, which extends from the large diameter fitting portion, is increased in its diameter from the large diameter fitting portion to an outer peripheral side, and is also deformed and extended from the large diameter fitting portion toward an inner peripheral side; and a small diameter fitting portion which is formed, at an end portion of the bellows portion, into an annular shape having a shorter diameter than that of the large diameter fitting portion so as to be fitted to an outer periphery of the piston, and
  wherein the large diameter fitting portion of the piston boot includes a cut-away portion at a position on the bellows portion side so that a part of the metal member is exposed to an outside.

According to one embodiment of the present invention, there is provided a piston boot which is arranged between a step portion formed on an opening end side of a cylinder including a bore portion formed in a caliper of a disc brake and a tip side of a piston accommodated in the bore portion movably in the axial direction,
  the piston boot further comprising a bellows portion configured to expand and contract along with the movement of the piston,
  wherein the piston boot includes: a large diameter fitting portion having an annular shape and containing an annular metal member so as to be fitted to the step portion; the bellows portion which extends from the large diameter fitting portion, is increased in its diameter from the large diameter fitting portion to an outer peripheral side, and which is also deformed and extended from the large diameter fitting portion toward an inner peripheral side; and a small diameter fitting portion which is formed, at an end portion of the bellows portion, into an annular shape having a shorter diameter than that of the large diameter fitting portion so as to be fitted to an outer periphery of the piston, and
  wherein the large diameter fitting portion of the piston boot includes a cut-away portion at a position on the bellows portion side so that a part of the metal member is exposed to an outside.

According to the one embodiment of the present invention, it is possible to suppress attachment of muddy water and the like to the metal member through the cut-away portions of the large diameter fitting portion, thereby being capable of increasing the corrosion resistance of the metal member.

DESCRIPTION OF EMBODIMENTS

Detailed description is now given of one embodiment of the present invention with reference to the accompanying drawings.

Figure 1:
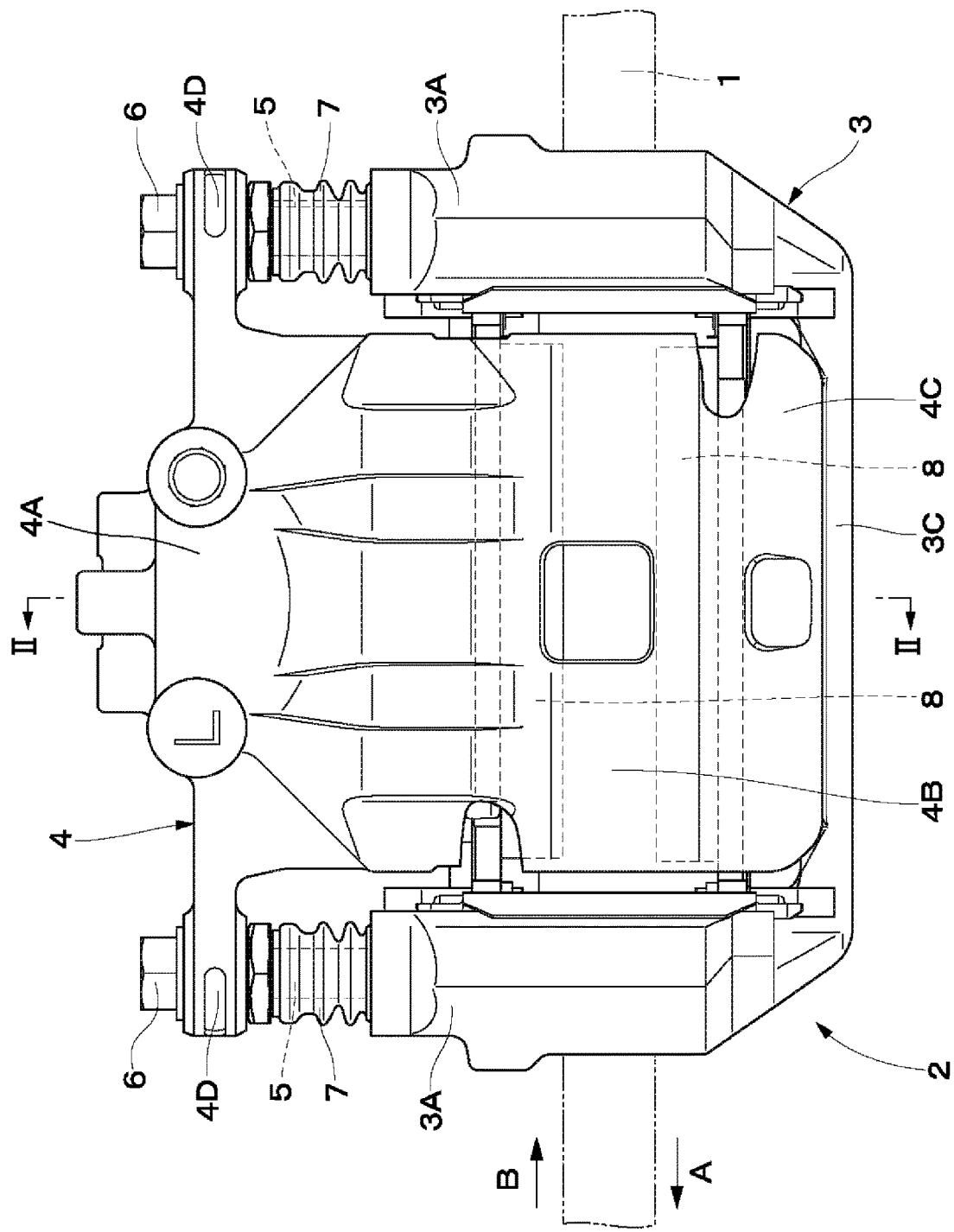
FIG. 1 is a plan view of a disc brake according to one embodiment of the present invention.

A disc 1 of FIG. 1 rotates, together with a wheel (not shown), toward an arrow A direction of FIG. 1 when a vehicle travels, for example, forward. The disc 1 rotates toward a direction indicated by an arrow B when the vehicle travels backward.

A disc brake 2 according to this embodiment includes a carrier 3 as a mounting member to be fixed to a non-rotational portion (not shown) on a vehicle body side. The carrier 3 includes a pair of arm portions 3A and a support portion 3B. The arm portions 3A are arranged so as to be apart from each other in a rotation direction (circumferential direction) of the disc 1 so as to straddle an outer peripheral side of the disc 1 in an axial direction, and so as to extend in the axial direction of the disc 1. The support portion 3B is thick, is formed so as to integrally couple base end sides of the respective arm portions 3A to each other, and which is fixed to the non-rotational portion of the vehicle on an inner side of the disc 1 being one side of the disc 1 in the axial direction.

Moreover, a reinforcing beam 3C is integrally formed with the carrier 3. The reinforcing beam 3C couples tip sides of the respective arm portions 3A to each other on an outer side being the other side of the disc 1 in the axial direction. With this structure, the respective arm portions 3A of the carrier 3 are integrally coupled to each other through intermediation of the support portion 3B on the inner side of the disc 1, and are integrally coupled to each other through intermediation of the reinforcing beam 3C on the outer side of the disc 1. Pad guides (not shown) are formed in each arm portion 3A on the both sides of the disc 1 in the axial direction. Each of the pad guide has a U shape in cross section, and guides a friction pad 8 described below in the axial direction of the disc 1.

A caliper 4 is slidably supported by the carrier 3. The caliper 4 includes an inner leg portion 4A, a bridge portion 4B, and an outer leg portion 4C. The inner leg portion 4A is formed on the inner side of the disc 1. The bridge portion 4B extends from the inner leg portion 4A toward the outer side of the disc 1 so as to straddle the outer peripheral side of the disc 1 between the respective arm portions 3A of the carrier 3. The outer leg portion 4C extends radially inward from the outer side being a tip side of the bridge portion 4B, and is formed as a claw portion 4C1 in a two-pronged shape on a tip side. Moreover, a cylinder 9 and a piston 11 described below are provided in the inner leg portion 4A of the caliper 4.

Further, a pair of mounting portions 4D protruding toward the rotation direction of the disc 1 are formed in the inner leg portion 4A. The mounting portions 4D slidably support the entire caliper 4 on the respective arm portions 3A of the carrier 3 through intermediation of sliding pins 5. A sliding pin 5 is fastened to each mounting portion 4D of the caliper 4 with a bolt 6. A tip side of each sliding pin 5 is slidably inserted into a pin hole (not shown) formed in each arm portion 3A of the carrier 3 along the axial direction of the disc 1. A protection boot 7 is mounted between each arm portion 3A and each sliding pin 5. The protection boot 7 prevents rain water and the like from entering between the sliding pin 5 and the pin hole of the arm portion 3A.

The pair of friction pads 8 are arranged under a state in which the friction pads 8 are opposed to each other as a pair on both surfaces (the inner side and the outer side) of the disc 1. Each of the friction pads 8 on the inner side and the outer side includes a lining 8A, which receives a friction force when the friction pads 8 come into contact with the disc 1. When the disc brake 2 operates, brake hydraulic pressure is supplied in a bore portion 9A of the cylinder 9 described below, and then the piston 11 moves toward the disc 1. With this structure, the friction pad 8 on the inner side is pressed against the disc 1 by the piston 11, and the caliper 4 thus displaces toward the inner side by a reaction force from the piston 11. As a result, the claw portion 4C1 of the outer leg portion 4C presses the friction pad 8 on the outer side against the disc 1, and the friction pads 8 on the outer side and the inner side are pressed against the both surfaces of the disc 1, with the result that the braking force is applied to the disc 1.

The cylinder 9 is provided in the inner leg portion 4A of the caliper 4. The cylinder 9 includes the bore portion 9A formed of a cylindrical bottomed hole. The piston 11 is slidably inserted into the bore portion 9A. One side of the cylinder 9 in the axial direction serves as a bottom portion 9B of the bore portion 9A. A brake fluid passage 9C penetrating in the axial direction is formed in a center portion of the bottom portion 9B. A brake hydraulic pressure is suppled to and discharged from the bore portion 9A of the cylinder 9 through the brake fluid passage 9C. The other side of the cylinder 9 in the axial direction serves as an opening end 9D. The piston 11 is inserted into the bore portion 9A through the opening end 9D.

On the opening end 9D side of the cylinder 9, an annular step portion 9E having a larger diametrical dimension than that of an inner diameter of the bore portion 9A is formed concentrically with the bore portion 9A. The step portion 9E is formed of a small diameter step portion 9E1 and a large diameter step portion 9E2. The small diameter step portion 9E1 is located on the bottom portion 9B side. The large diameter step portion 9E2 has a larger diametrical dimension than a diametrical dimension of the small diameter step portion 9E1, and is adjacent to the small diameter step portion 9E1 in the axial direction. A large diameter fitting portion 12A of a piston boot 12 described below is fitted to the small diameter step portion 9E1. A bellows portion 12B of the piston boot 12 described below is accommodated in the large diameter step portion 9E2. An annular seal groove 9F is formed over the entire circumference at a position of the cylinder 9 on the bottom portion 9B side with respect to the step portion 9E. An O-ring 10 is mounted to the seal groove 9F. A gap between an inner peripheral surface of the bore portion 9A of the cylinder 9 and a below-mentioned outer peripheral surface 11B of the piston 11 is sealed by the O-ring 10.

The piston 11 is accommodated movably in the axial direction in the bore portion 9A of the cylinder 9. The piston 11 is formed into a bottomed cylindrical shape. A tip 11A of the piston 11 protrudes from the bore portion 9A, and is brought into abutment against the friction pad 8. The piston 11 protrudes from the bore portion 9A, to thereby press the friction pad 8 toward the disc 1 through the supply of the brake hydraulic pressure into the bore portion 9A via the brake fluid passage 9C of the cylinder 9. In the outer peripheral surface 11B of the piston 11 on the tip 11A side, there is formed an annular groove 11C over the entire circumference. To the annular groove 11C, a below-mentioned small diameter fitting portion 12C of the piston boot 12 is fitted.

Description is now given of the piston boot used in this embodiment.

Figure 2:
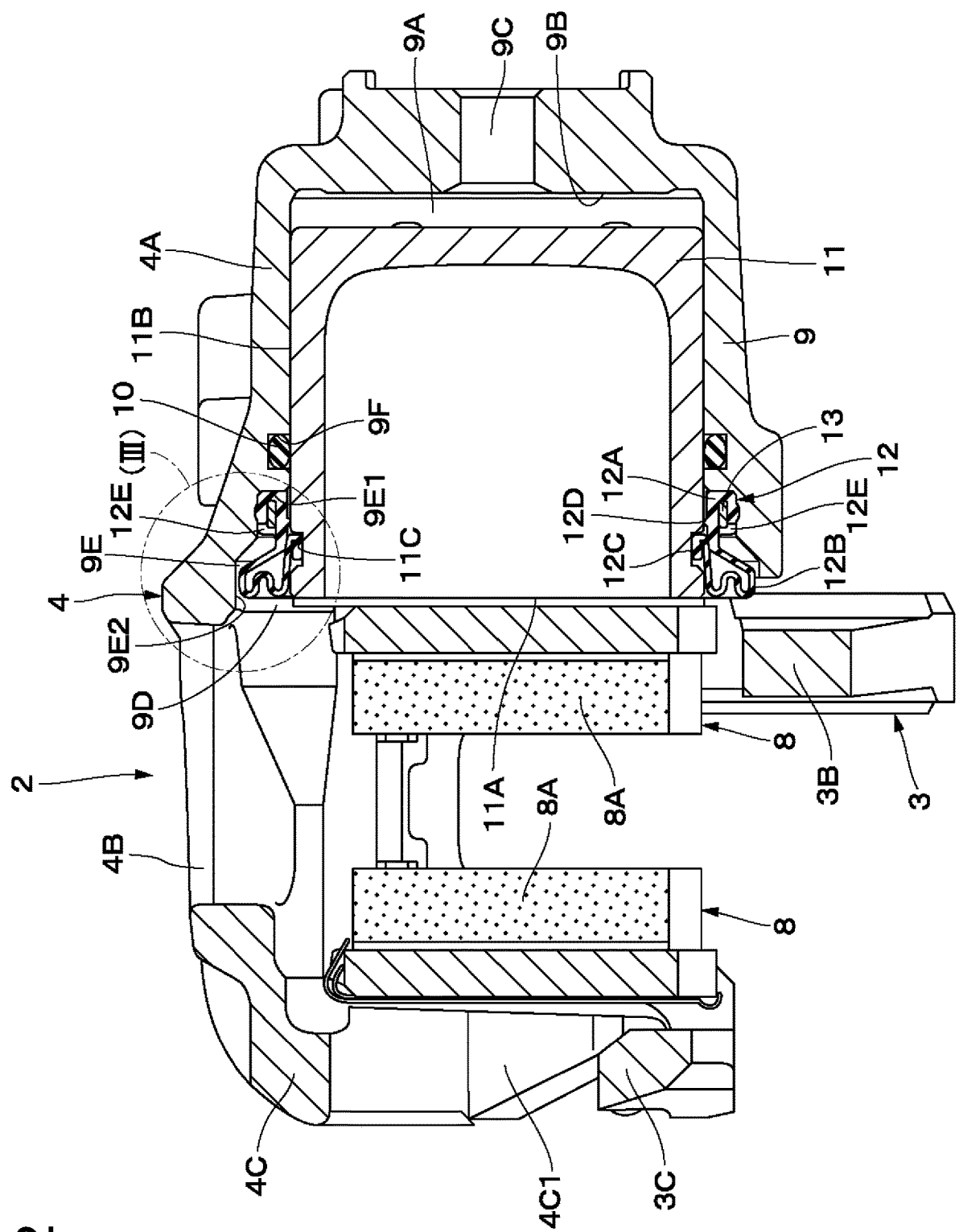
Figure 3:
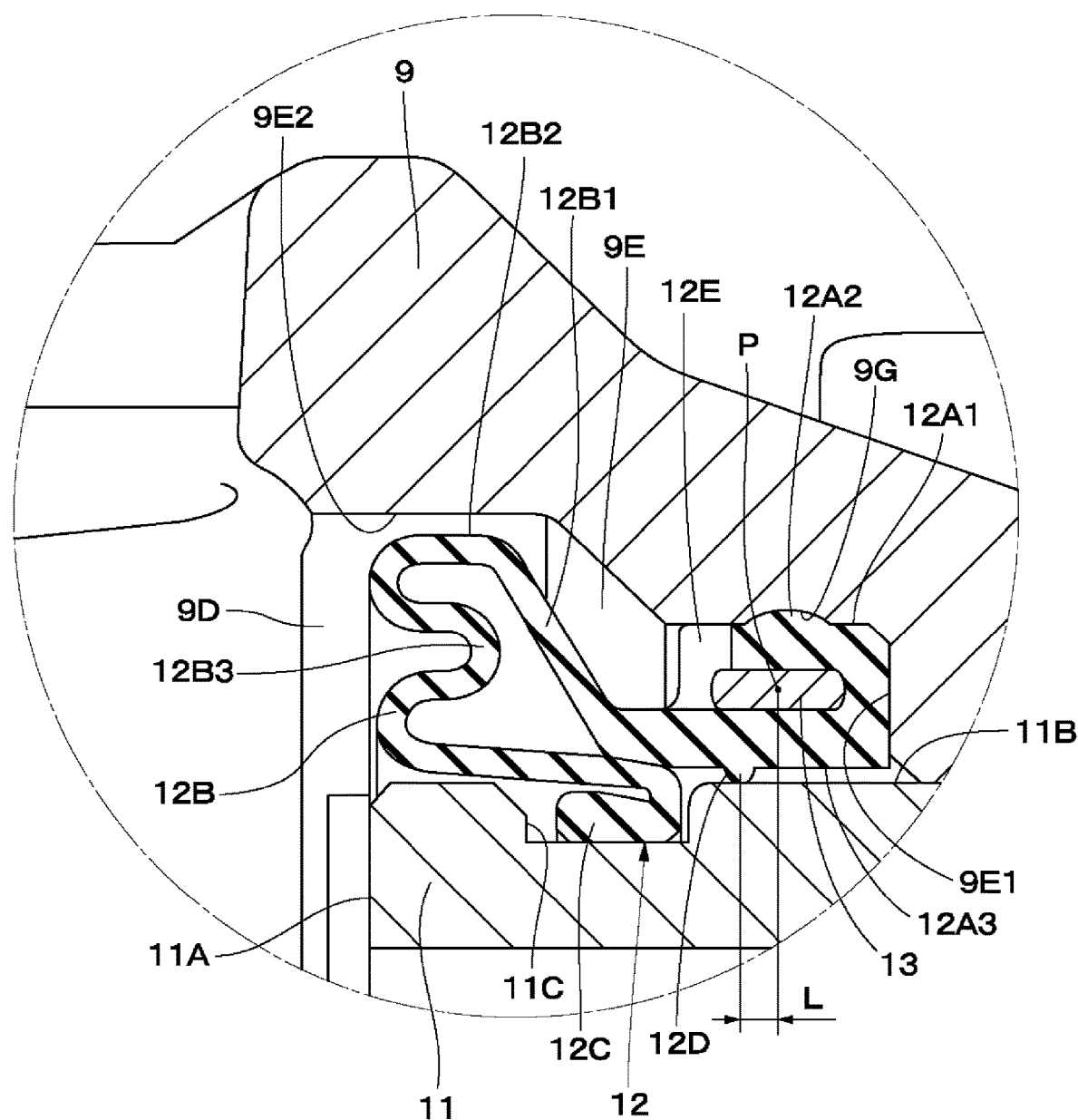
FIG. 3 is an enlarged cross-sectional view of a portion III of FIG. 2 indicating a piston boot.
Figure 4:
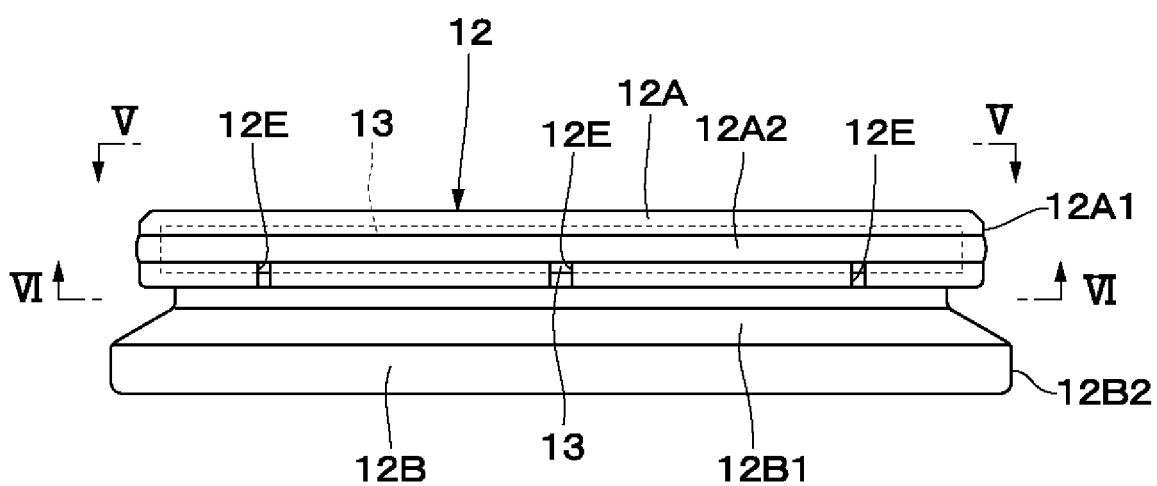
FIG. 4 is a side view for illustrating the piston boot as a single component.
Figure 5:
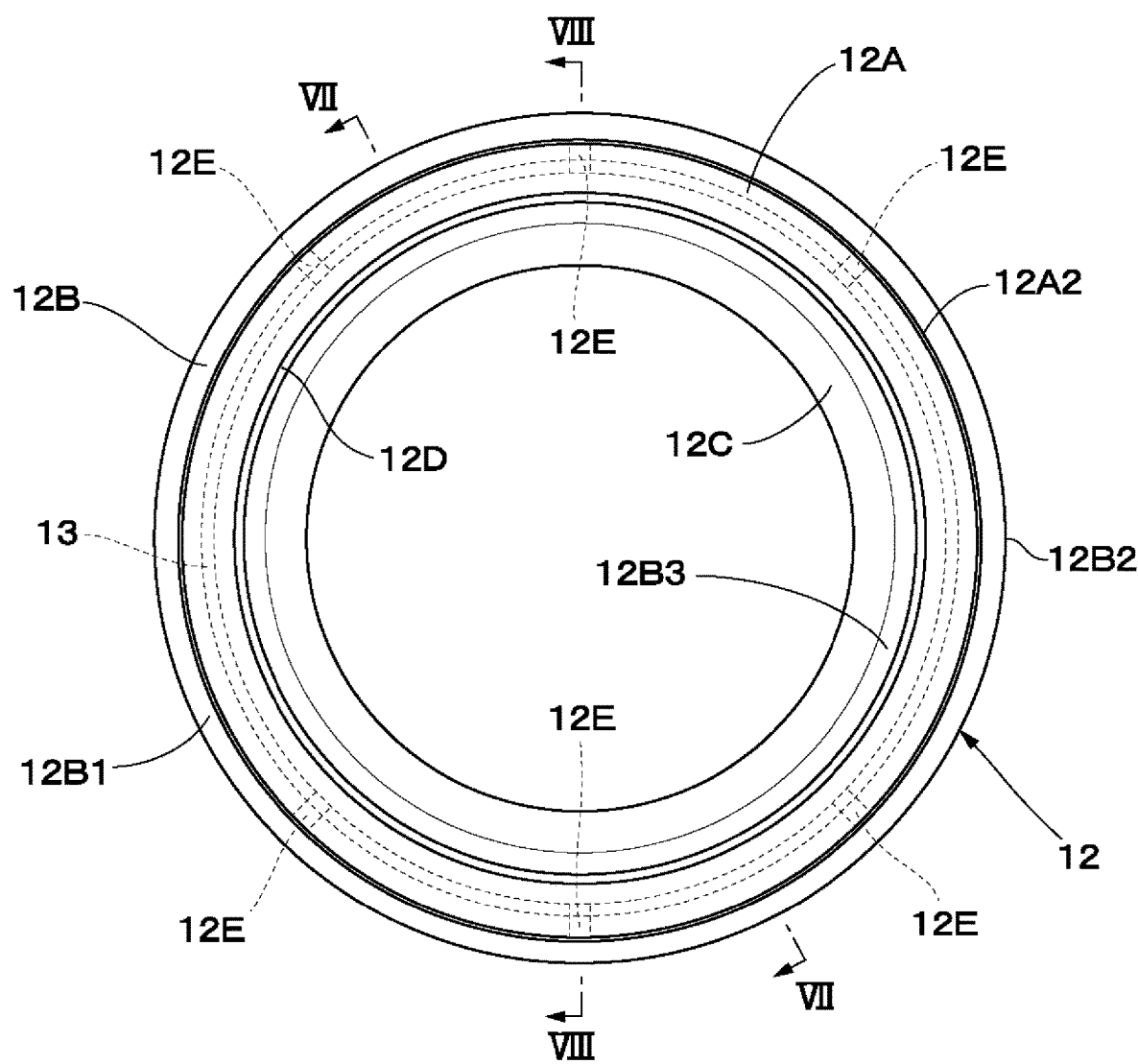
FIG. 5 is a plan view of the piston boot as viewed from an arrow V-V direction of FIG. 4.
Figure 6:
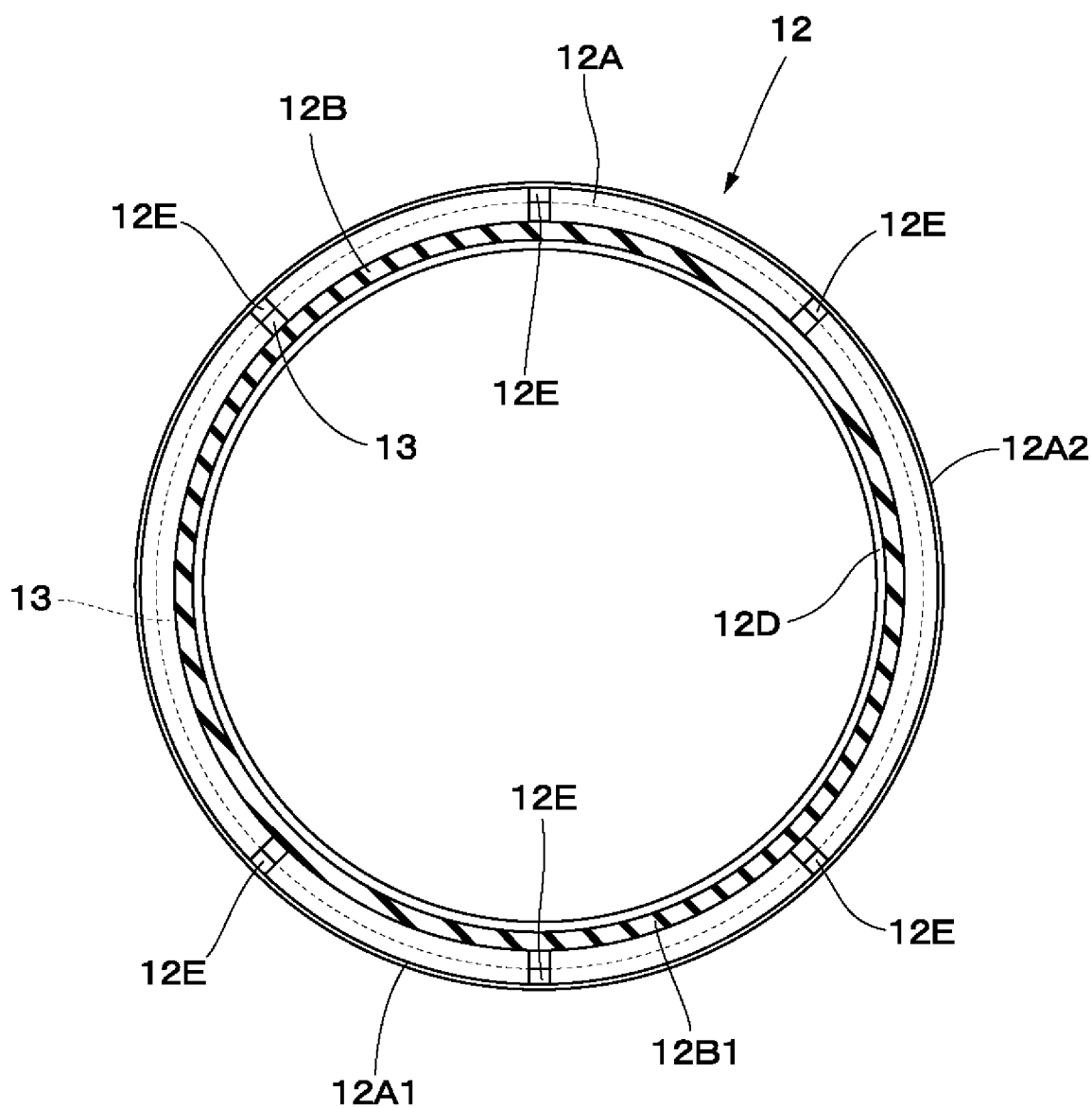
FIG. 6 is a cross-sectional view of the piston boot as viewed from an arrow VI-VI direction of FIG. 4.
Figure 7:
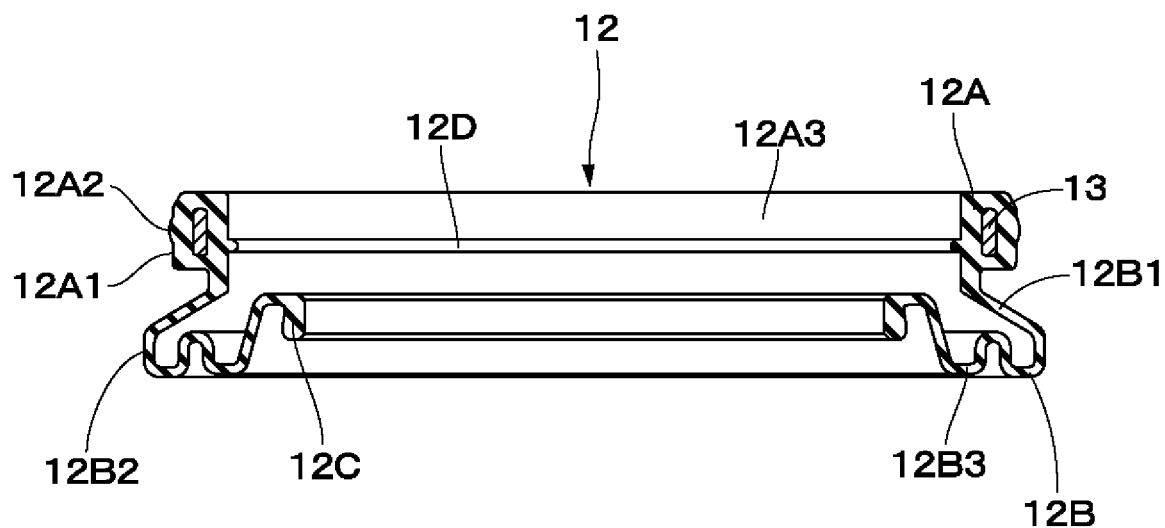
FIG. 7 is a cross-sectional view of the piston boot as viewed from an arrow VII-VII direction of FIG. 5.
Figure 8:
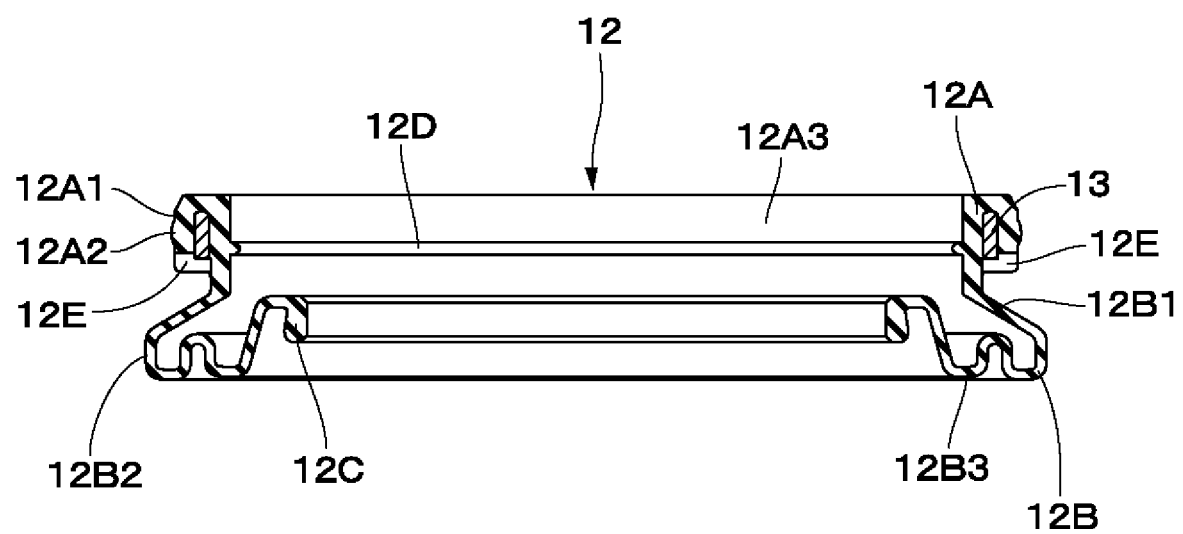
FIG. 8 is a cross-sectional view of the piston boot as viewed from an arrow VIII-VIII direction of FIG. 5.

As illustrated in FIG. 2 and FIG. 3, the piston boot 12 is provided between the tip 11A side of the piston 11 and the small diameter step portion 9E1 of the cylinder 9. The piston boot 12, which expands and contracts as the piston 11 moves, seals between an inner peripheral surface of the cylinder 9 (bore portion 9A) and the outer peripheral surface 11B of the piston 11, to thereby serve to prevent foreign matters such as dusts and the rain water from entering thereinto. As illustrated in FIG. 4 to FIG. 8, the piston boot 12 is integrally molded by using a flexible material such as rubber or synthetic resin, and is configured by including a large diameter fitting portion 12A, a metal member 13, the bellows portion 12B, the small diameter fitting portion 12C, and an annular protruding portion 12D.

The large diameter fitting portion 12A serving as a fitting portion is provided so as to fit to the small diameter step portion 9E1 of the cylinder 9. The large diameter fitting portion 12A is formed into an annular shape (cylindrical shape) corresponding to the small diameter step portion 9E1 of the cylinder 9, and contains (buried) the metal member 13 having an annular shape. The metal member 13 is formed of an annular body having a diameter longer than the inner diameter of the bore portion 9A of the cylinder 9, and shorter than the inner diameter of the small diameter step portion 9E1, and is molded integrally with the piston boot 12. The metal member 13 increases stiffness of the large diameter fitting portion 12A. On an outer peripheral surface 12A1 of the large diameter fitting portion 12A, an annular outer peripheral protrusion 12A2 is formed over the entire circumference. The outer peripheral protrusion 12A2 is fitted to an annular recessed portion 9G formed in an inner peripheral surface of the small diameter step portion 9E1 of the cylinder 9, thereby preventing the large diameter fitting portion 12A from being pulled off from the small diameter step portion 9E1 of the cylinder 9.

The bellows portion 12B protrudes from the large diameter fitting portion 12A toward the opening end 9D side of the cylinder 9, and is accommodated in the large diameter step portion 9E2 of the cylinder 9. The bellows portion 12B includes an extension portion 12B1 and a stretchable portion 12B3. The extension portion 12B1 extends from the large diameter fitting portion 12A toward the opening end 9D side of the cylinder 9, and increases in diameter to the outer peripheral side (outside in the radial direction) with respect to the outer peripheral surface 12A1 of the large diameter fitting portion 12A. The stretchable portion 12B3 is folded back from an outer peripheral end 12B2 of the extension portion 12B1 toward the radially inside, and deflects and extends in the bellows form toward the inner peripheral side with respect to an inner peripheral surface 12A3 of the large diameter fitting portion 12A. In this case, the outer peripheral end 12B2 of the extension portion 12B1 is arranged on the radially outside the outer peripheral surface 12A1 of the large diameter fitting portion 12A (see FIG. 3). The small diameter fitting portion 12C is provided at an end portion on a radially inside of the stretchable portion 12B3 forming the bellows portion 12B. The small diameter fitting portion 12C is formed into an annular shape having a shorter diameter than that of the large diameter fitting portion 12A, and is fitted to the annular groove 11C of the piston 11.

The annular protruding portion 12D is formed on the inner peripheral surface 12A3 of the large diameter fitting portion 12A. The annular protruding portion 12D protrudes in an annular shape over the entire periphery from the inner peripheral surface 12A3 of the large diameter fitting portion 12A. The annular protruding portion 12D is brought into abutment against the outer peripheral surface 11B of the piston 11, thereby securing a centering property of the piston 11 with respect to the bore portion 9A of the cylinder 9. As illustrated in FIG. 3, when the center of a cross section of the metal member 13 contained in the large diameter fitting portion 12A is denoted by P, the annular protruding portion 12D is formed at a position closer by a dimension L to the bellows portion 12B than the cross-sectional center P of the metal member 13 in the axial direction of the piston 11.

The bellows portion 12B of the piston boot 12 has higher flexibility than the large diameter fitting portion 12A containing the metal member 13, and is thus liable to deform. Thus, when the molded piston boot 12 is removed from a mold, the bellows portion 12B liable to deform is removed first from the mold, and, after that, the large diameter fitting portion 12A less liable to deform is removed in the stated order. Meanwhile, the annular protruding portion 12D is arranged on the bellows portion 12B side with respect to the cross-sectional center P of the metal member 13, and thus has such a configuration as to be easily removed from the mold by deforming the annular protruding portion 12D together with the bellows portion 12B.

A plurality of cut-away portions 12E are formed at a portion of an intersection between the large diameter fitting portion 12A and the extension portion 12B1 of the bellows portion 12B, that is, a portion of the large diameter fitting portion 12A on the bellows portion 12B side. The plurality of cut-away portions 12E are arranged at a plurality of positions (such as six positions) apart from each other in a circumferential direction of the metal member 13. At the positions of the cut-away portions 12E, the metal member 13 is not covered with the rubber of the piston boot 12, and the metal member 13 is thus exposed to an outside. That is, the large diameter fitting portion 12A of the piston boot 12 includes the plurality of cut-away portions 12E at positions on the bellows portion 12B side, the parts of the metal member 13 being exposed to the outside in the cut-away portions 12E.

The piston boot 12, which contains the annular metal member 13, is manufactured through use of the mold including a lower mold, an upper mold, a middle mold, and the like (none of those molds are shown). When the piston boot 12 is manufactured, the rubber material is injected into the mold under a state in which the metal member 13 is positioned (constrained) with respect to the lower mold by a plurality of positioning tools (not shown). As a result, the piston boot 12 containing the metal member 13 can integrally be molded. Thus, the plurality of cut-away portions 12E are formed at portions of the large diameter fitting portion 12A corresponding to the positioning tools. In each cut-away portion 12E, the metal member 13 is exposed to the outside under the state in which the parts of the metal member 13 are not covered with the rubber material.

In this case, the diameter of the outer peripheral end 12B2 of the extension portion 12B1 forming the bellows portion 12B is increased to the outer peripheral side (radially outside) with respect to the outer peripheral surface 12A1 of the large diameter fitting portion 12A. Consequently, each cut-away portion 12E formed at the portion of the large diameter fitting portion 12A on the bellows portion 12B side is covered with the bellows portion 12B in the axial direction of the piston 11. As a result, even when the muddy water is scattered toward the piston 11 during the travel of the vehicle, the muddy water is blocked by the bellows portion 12B of the piston boot 12, and does not thus reach the large diameter fitting portion 12A. Thus, the entry of the muddy water to each cut-away portion 12E formed in the large diameter fitting portion 12A is suppressed, and the metal member 13 is consequently protected from the muddy water, thereby providing a configuration capable of increasing the corrosion resistance of the metal member 13.

Moreover, the bellows portion 12B arranged between the large diameter fitting portion 12A and the small diameter fitting portion 12C of the piston boot 12 is formed of the extension portion 12B1 and the stretchable portion 12B3. The extension portion 12B1 extends from the large diameter fitting portion 12A toward the opening end 9D side of the cylinder 9. The stretchable portion 12B3 is folded back from the outer peripheral end 12B2 of the extension portion 12B1 toward the radially inside, and then extends to the small diameter fitting portion 12C. That is, the bellows portion 12B radially deflects at the position apart toward the opening end 9D side of the cylinder 9 with respect to the large diameter fitting portion 12A and the small diameter fitting portion 12C in the axial direction of the piston 11. As a result, for example, compared to the structure in which the bellows portion is arranged under the radially deflected state between the large diameter fitting portion and the small diameter fitting portion as a piston boot disclosed in Patent Literature 1, the radial dimension of the piston boot 12 can be suppressed to a short length. As a result, it is possible to narrow a layout of the cylinder 9 on the opening end 9D side provided with the piston boot 12, to thereby provide a configuration capable of reducing the weight of the caliper 4.

When a piston boot, which contains an annular metal member, is manufactured, a mold (die) formed of a lower mold, an upper mold, a middle mold, and the like is usually used. A rubber material is injected into the mold (cavity) under the state in which positioning jigs are used to position (constrain) the annular metal member with respect to the lower mold or the like, to thereby integrally mold the piston boot containing the metal member. However, when the positioning jigs are used to position the metal member, parts of the metal member brought into contact with the positioning jigs are exposed to the outside under the state in which the portions are not covered with the rubber material. A plurality of positioning jigs are usually arranged in a circumferential direction of the metal member, and a plurality of cut-away portions are formed in the molded piston boot. Parts of the metal member are exposed to the outside at the cut-away portions. As a result, there occurs such a problem that muddy water is scatted toward the piston boot during the travel of a vehicle, the muddy water enters into the respective cut-away portions of the piston boot, and the corrosion resistance of the metal member decreases.

Meanwhile, in the piston boot 12 according to this embodiment, even when the plurality of cut-away portions 12E are formed around the large diameter fitting portion 12A for the convenience of the manufacturing, the cut-away portions 12E are arranged at the positions of the large diameter fitting portion 12A on the bellows portion 12B side. As a result, the respective cut-away portions 12E can be covered with the bellows portion 12B increased in diameter to the outer peripheral side (radially outside) with respect to the large diameter fitting portion 12A. Owing this structure, the muddy water scattered to the piston 11 during the travel of the vehicle can be blocked by the bellows portion 12B, and it is thus possible to prevent the muddy water from attaching to the metal member 13 through the respective cut-away portions 12E.

The disc brake 2 according to this embodiment has the above-mentioned configuration. Description is now given of an operation of the disc brake 2.

When the brake operation is executed during the travel of the vehicle, the brake hydraulic pressure is supplied to the inside of the bore portion 9A of the cylinder 9 formed in the caliper 4 through the brake fluid passage 9C. As a result, the piston 11 moves in the bore portion 9A of the cylinder 9 toward the opening end 9D side, and presses the friction pad 8 on the inner side. With this structure, the caliper 4 displaces toward the inner side by the reaction force from the piston 11. As a result, the claw portion 4C1 of the outer leg portion 4C presses the friction pad 8 on the outer side against the disc 1. The friction pads 8 on the outer side and the inner side are pressed against the both surfaces of the disc 1, with the result that the braking force is applied to the vehicle. Under this state, while the piston boot 12 expands and contracts (elastically deforms) as the piston 11 moves, the piston boot 12 seals between the inner peripheral surface of the cylinder 9 (bore portion 9A) and the outer peripheral surface 11B of the piston 11, to thereby prevent the foreign matters such as the dusts and the rain water from entering thereinto.

In this case, the plurality of cut-away portions 12E are formed at the large diameter fitting portion 12A of the piston boot 12 by using the positioning jigs (none of those jigs are shown) to position the metal member 13 with respect to the mold when the annular metal member 13 is molded integrally with the large diameter fitting portion 12A. Thus, the parts of the metal member 13 molded integrally with the piston boot 12 are exposed to the outside at the positions of the respective cut-away portions 12E.

However, the respective cut-away portions 12E are formed at the positions of the large diameter fitting portion 12A on the bellows portion 12B side. The outer peripheral end 12B2 of the extension portion 12B1 forming the bellows portions 12B increases in diameter to the outer peripheral side with respect to the outer peripheral surface 12A1 of the large diameter fitting portion 12A. Thus, each cut-away portion 12E is covered with the bellows portion 12B in the axial direction of the piston 11. As a result, even when the muddy water is scattered toward the piston 11 during the travel of the vehicle, the muddy water is blocked by the bellows portion 12B of the piston boot 12, and does not thus reach the large diameter fitting portion 12A. Consequently, the entry of the muddy water to each cut-away portion 12E formed in the large diameter fitting portion 12A is suppressed, and the metal member 13 is thus protected from the muddy water, thereby being capable of increasing the corrosion resistance of the metal member 13.

In other words, as the structure of the mold used to mold the piston boot 12, even in the case of employing the structure in which the respective cut-away portions 12E are arranged at the positions of the large diameter fitting portion 12A on the bellows portion 12B side, the entry of the muddy water into the respective cut-away portions 12E can be suppressed. As a result, options of the structure of the mold used to mold the piston boot 12 can be expanded, and the mold structure can be simplified, which also contributes to a reduction in manufacturing cost of the piston boot 12.

Moreover, the annular protruding portion 12D formed on the inner peripheral surface 12A3 of the large diameter fitting portion 12A of the piston boot 12 is arranged at the position closer to the bellows portion 12B with respect to the cross-sectional center P of the metal member 13 contained in the large diameter fitting portion 12A. As described above, the annular protruding portion 12D is arranged closer to the bellows portion 12B, which is more liable to deform than the large diameter fitting portion 12A, which contains the metal member 13, thereby facilitating the removal of the annular protruding portion 12D together with the bellows portion 12B when the molded piston boot 12 is removed from the mold.

Thus, the disc brake 2 according to this embodiment includes the piston 11, the cylinder 9, which includes the bore portion 9A and the step portion 9E, the bore portion 9A movably accommodating the piston 11, the step portion 9E being in the annular shape on the opening end 9D side of the bore portion 9A, and the piston boot 12 arranged between the tip side of the piston 11 and the small diameter step portion 9E1 of the cylinder 9. The piston boot 12 includes the annular large diameter fitting portion 12A, which contains the annular metal member 13, and is fitted to the small diameter step portion 9E1, the bellows portion 12B, which extends from the large diameter fitting portion 12A, increases in diameter to the outer peripheral side with respect to the large diameter fitting portions 12A, and deflects and extends toward the inner peripheral side with respect to the large diameter fitting portion 12A, and the small diameter fitting portion 12C, which is formed, at the end portion of the bellows portion 12B, into the annular shape having the smaller diameter than that of the large diameter fitting portion 12A, and is fitted to the outer periphery of the piston 11. The large diameter fitting portion 12A of the piston boot 12 includes, at the positions on the bellows portion 12B side, the cut-away portions 12E, the parts of the metal member 13 being exposed to the outside at the cut-away portions 12E.

With this structure, the cut-away portions 12E formed at the large diameter fitting portion 12A can be covered, in the axial direction of the piston 11, with the bellows portion 12B, which increases in diameter to the outer peripheral side with respect to the large diameter fitting portion 12A. As a result, the muddy water scattered toward the piston 11 during the travel of the vehicle are blocked by the bellows portion 12B of the piston boot 12, thereby being capable of suppressing the entry of the muddy water into the cut-away portions 12E, and the corrosion resistance of the metal member 13 can thus be increased.

In addition, the bellows portion 12B is formed of the extension portion 12B1 and the stretchable portion 12B3. The extension portion 12B1 extends from the large diameter fitting portion 12A to the opening end 9D side of the cylinder 9. The stretchable portion 12B3 is folded back from the outer peripheral end 12B2 of the extension portion 12B1 toward the radially inside, and extends to the small diameter fitting portion 12C. That is, the bellows portion 12B radially deflects at the position apart toward the opening end 9D side of the cylinder 9 with respect to the large diameter fitting portion 12A and the small diameter fitting portion 12C in the axial direction of the piston 11. As a result, the radial dimension of the piston boot 12 can be suppressed to a short length, and it is thus possible to narrow the layout on the opening end 9D side of the cylinder 9 provided with the piston boot 12, thereby being capable of reducing the weight of the caliper 4.

In the above-mentioned respective embodiments, the description is given of, as an example, the disc brake 2 including the one set of the bore portion 9A and the piston 11. However, the present invention is not limited to this example, and can be applied to an opposed type disc brake including, for example, two sets of the bore portion and the piston, and the pistons opposed to each other are arranged on both sides of the disc in the axial direction, and press the pads from the both sides.

As the disc bake and the piston boot based on the embodiment described above, for example, the following aspects are conceivable.

As a first aspect, there is provided a disc brake, including: a cylinder, which includes a bottomed bore portion and a step portion, the bore portion accommodating a piston movably in an axial direction, the step portion being in an annular shape, and having, on an opening end side of the bore portion, a diametrical dimension larger than the inner diameter of the bore portion, a tip of the piston protruding from the opening end side; the piston configured to press at least one of a pair of pads opposed to each other on both surfaces of a disc; and a piston boot, which is arranged between the tip side of the piston and the step portion of the cylinder, and includes a bellows portion configured to expand and contract along with the movement of the piston, wherein the piston boot includes a large diameter fitting portion, the bellows portion, and a small diameter fitting portion, the large diameter fitting portion being in an annular shape, containing an annular metal member, and being fitted to the step portion, the bellows portion extending from the large diameter fitting portion, increasing in diameter from the large diameter fitting portion to an outer peripheral side, and deflecting and extending from the large diameter fitting portion toward an inner peripheral side, the small diameter fitting portion being formed, at an end portion of the bellows portion, into an annular shape having a shorter diameter than that of the large diameter fitting portion, and fitting to an outer periphery of the piston, and wherein the large diameter fitting portion of the piston boot includes a cut-away portion at a position on the bellows portion side, a part of the metal member being exposed to the outside in the cut-away portion.

As a second aspect, in the first aspect, the large diameter fitting portion of the piston boot includes an annular protruding portion, which is formed on the inner peripheral side, and is brought into abutment against an outer peripheral surface of the piston, and wherein the annular protruding portion is formed at a position close to the bellows portion with respect to the center of a cross section of the metal member in the axial direction of the piston.

As a third aspect, in the first or second aspect, the cut-away portion is formed at a plurality of positions of the large diameter fitting portion in a circumferential direction.

As a fourth aspect, there is provided a piston boot, the piston boot being arranged between a step portion formed on an opening end side of a cylinder and a tip side of a piston, the cylinder including a bore portion formed in a caliper of a disc brake, the piston being accommodated in the bore portion movably in the axial direction, the piston boot including a bellows portion configured to expand and contract along with the movement of the piston, wherein the piston boot includes a large diameter fitting portion, the bellows portion, and a small diameter fitting portion, the large diameter fitting portion being in an annular shape, containing an annular metal member, and being fitted to the step portion, the bellows portion extending from the large diameter fitting portion, increasing in diameter from the large diameter fitting portion to an outer peripheral side, and deflecting and extending from the large diameter fitting portion toward an inner peripheral side, the small diameter fitting portion being formed, at an end portion of the bellows portion, into an annular shape having a shorter diameter than that of the large diameter fitting portion, and fitting to an outer periphery of the piston, and wherein the large diameter fitting portion of the piston boot includes a cut-away portion at a position on the bellows portion side, a part of the metal member being exposed to the outside in the cut-away portion.

As a fifth aspect, in the fourth aspect, the large diameter fitting portion of the piston boot includes an annular protruding portion, which is formed on the inner peripheral side, and is brought into abutment against an outer peripheral surface of the piston, and wherein the annular protruding portion is formed at a position close to the bellows portion with respect to the center of a cross section of the metal member in the axial direction of the piston.

As a sixth aspect, in the fourth or the fifth aspect, the cut-away portion is formed at a plurality of positions of the large diameter fitting portion in a circumferential direction.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-237272 filed on Dec. 19, 2018. All disclosed contents including Specification, Scope of Claims, Drawings, and Abstract of Japanese Patent Application No. 2018-237272 filed on Dec. 19, 2018 are incorporated herein by reference in their entirety.

REFERENCE SIGNS LIST 1 disc, 8 friction pad (pad), 9 cylinder, 9A bore portion, 9D opening end, 9E1 small diameter step portion (step portion), 11 piston, 11B outer peripheral surface, 12 piston boot, 12A large diameter fitting portion (fitting portion), 12B bellows portion, 12C small diameter fitting portion, 12E cut-away portion, 13 metal member

The invention claimed is:

1. A disc brake, comprising:
a piston configured to press at least one of a pair of pads opposed to each other on both surfaces of a disc;
a cylinder which includes: a bottomed bore portion for accommodating the piston movably in an axial direction; and a step portion formed on an opening end side of the bottomed bore portion from which a tip of the piston protrudes, the step portion having an annular shape and a diametrical dimension larger than an inner diameter of the bottomed bore portion; and
a piston boot which is arranged between the tip side of the piston and the step portion of the cylinder, and includes a bellows portion configured to expand and contract along with the movements of the piston,
wherein the piston boot includes:
a large diameter fitting portion having an annular shape and containing an annular metal member so as to be fitted to the step portion;
the bellows portion, which extends from the large diameter fitting portion, is increased radially outside beyond the large diameter fitting portion to an outer peripheral side, and is also deformed and extended from the large diameter fitting portion toward an inner peripheral side; and
a small diameter fitting portion which is formed, at an end portion of the bellows portion, into an annular shape having a shorter diameter than that of the large diameter fitting portion so as to be fitted to an outer periphery of the piston, and
wherein the large diameter fitting portion of the piston boot includes a cut-away portion at a position on the bellows portion side so that a part of the metal member is exposed to an outside.

2. The disc brake according to claim 1,
wherein the large diameter fitting portion of the piston boot includes an annular protruding portion, which is formed on the inner peripheral side, and is brought into abutment against an outer peripheral surface of the piston, and
wherein the annular protruding portion is formed at a position closer to the bellows portion with respect to the center of a cross section of the metal member in the axial direction of the piston.

3. The disc brake according to claim 1, wherein the cut-away portion is formed at a plurality of positions of the large diameter fitting portion in a circumferential direction.

4. The disc brake according to claim 2, wherein the cut-away portion is formed at a plurality of positions of the large diameter fitting portion in a circumferential direction.

5. A piston boot which is arranged between a step portion formed on an opening end side of a cylinder including a bore portion formed in a caliper of a disc brake and a tip side of a piston accommodated in the bore portion movably in the axial direction,
the piston boot further comprising a bellows portion configured to expand and contract along with the movement of the piston,
wherein the piston boot includes:
a large diameter fitting portion having an annular shape and containing an annular metal member so as to be fitted to the step portion;
the bellows portion which extends from the large diameter fitting portion, is increased radially outside beyond the large diameter fitting portion to an outer peripheral side, and which is also deformed and extended from the large diameter fitting portion toward an inner peripheral side; and
a small diameter fitting portion which is formed, at an end portion of the bellows portion, into an annular shape having a shorter diameter than that of the large diameter fitting portion so as to be fitted to an outer periphery of the piston, and
wherein the large diameter fitting portion of the piston boot includes a cut-away portion at a position on the bellows portion side so that a part of the metal member is exposed to an outside.

6. The piston boot according to claim 5,
wherein the large diameter fitting portion of the piston boot includes an annular protruding portion, which is formed on the inner peripheral side, and is brought into abutment against an outer peripheral surface of the piston, and
wherein the annular protruding portion is formed at a position close to the bellows portion with respect to the center of a cross section of the metal member in the axial direction of the piston.

7. The piston boot according to claim 5, wherein the cut-away portion is formed at a plurality of positions of the large diameter fitting portion in a circumferential direction.

8. The piston boot according to claim 6, wherein the cut-away portion is formed at a plurality of positions of the large diameter fitting portion in a circumferential direction.

* * * * *